Oct. 17, 1933.  K. L. HERRMANN  1,931,073
ANTIFRICTION BEARING
Filed Nov. 7, 1931
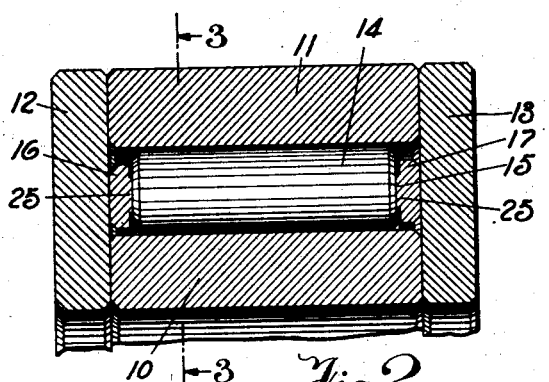
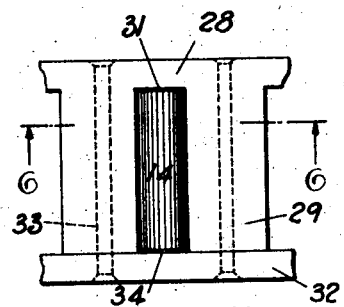
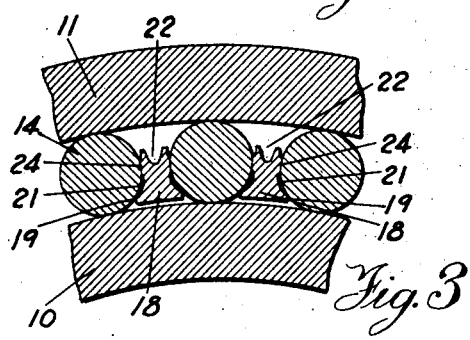
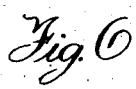
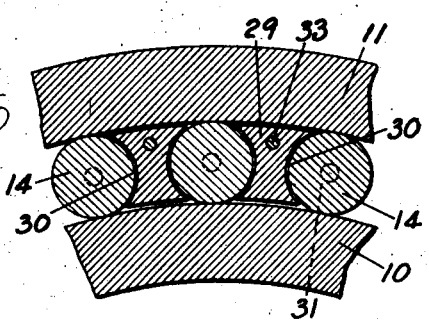
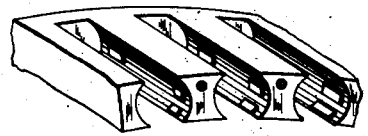
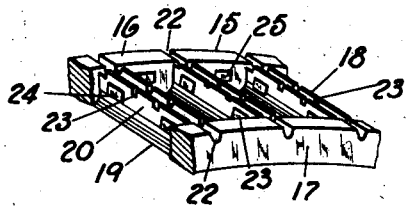
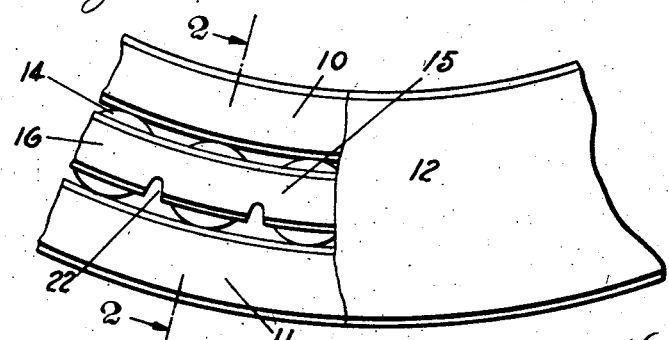
INVENTOR.
Karl L. Herrmann
BY
ATTORNEYS.

Patented Oct. 17, 1933

1,931,073

UNITED STATES PATENT OFFICE 1,931,073

ANTIFRICTION BEARING

Karl L. Herrmann, South Bend, Ind., assignor to The Bantam Ball Bearing Company, South Bend, Ind., a corporation of Indiana Application November 7, 1931. Serial No. 573,621

2 Claims. (Cl. 308—217)

This invention relates to anti-friction bearings and particularly to the retainer for the bearing rollers whereby the rollers are held in fixed alignment relative to each other, the retainer being adapted to facilitate the assembling or disassembling of the parts of the bearing and to permit a greater number of rollers to be used in a given sized bearing than in bearings now commonly used.

One of the objects is to provide a retainer having side rings and bars bridging the rings and adapted to receive the rollers between the respective side and bridge members, pads being formed on the side rings and bridge portions to properly position the rollers relative to each other.

Another object is to provide a retainer having roller receiving openings therein, the retainer having pads projecting therefrom to provide predetermined contact areas with the rollers.

The above being among the objects of the present invention, the same consists of certain mechanical details and combination of parts to be hereinafter described, and then claimed, having the above and other objects in view.

In the accompanying drawing which illustrates suitable embodiments of the present invention, Figure 1 is a fragmentary side elevational view of the bearing, certain parts being broken away to better illustrate the construction thereof.

Figure 2 is a sectional view taken on the line 2—2 of Figure 1.

Figure 3 is a sectional view taken on the line 3—3 of Figure 2.

Figure 4 is a perspective view of the retainers illustrated in the preceding views.

Figure 5 is a fragmentary plan view of a retainer, illustrating a modified form of the invention.

Figure 6 is a sectional view taken on the line 6—6 of Figure 5.

Figure 7 is a perspective view of the retainer shown in Figures 5 and 6.

Referring to the drawing in which like numerals refer to like parts throughout the several views, the preferred form of anti-friction bearing comprises an inner race member 10 in the form of a flat ring, an outer race member 11 also in the form of a flat ring, having a greater diameter than and overlying the inner race member 10. Abutting against the edges of the inner and outer race members are a pair of thrust rings 12 and 13. These rings have an oblong section and a radial dimension equal to the distance from the inner surface of the inner race member to the outer surface of the outer race member and serve when urged against the race members to retain the race members in radial alignment.

The thrust rings 12 and 13 may be secured, if desired, to either the inner or outer race member in any desired fashion. Between the inner and outer race members are a plurality of bearing rollers 14 mounted in a retainer generally indicated at 15 as illustrated in Figure 4.

The retainer 15 comprises a pair of rings 16 and 17 spaced apart and held parallel to each other by a series of bridging members or cross bars 18 extending between the rings. These spacing bars are equally spaced around the rings and are cast integrally therewith.

From an inspection of Figure 4, it will be observed that each of the spacing bars 18 is provided at its inner side with a pair of outwardly extending flanges 19 which give a cross sectional view of the bar a shape in the form of an inverted T. It will also be observed that the adjacent flanges on two consecutive bars extend partly under the roller 14 and effectively prevent the roller from slipping between the bars toward the center of the bearing.

It will be further noted from Figure 4 that the bars 18 are provided with straight side portions 20 extending parallel to the radius of the bearing, and that these side portions for a portion of the length of the cross member or bar are connected with the extremities of the flanges 19 by a curve having a radius much shorter than the radius of the roller 14 thereby leaving a space or pocket 21 between the cross member and the side of the roller in which lubricating material such as oil soaked waste may be inserted.

As particularly shown in Figurfe 4, it will be observed that each cross member or spacing bar 18 is provided with a trough-shaped groove 22 milled or cast therein and that this trough-shaped groove extends through the adjacent ring member at the ends of the cross member 18 and that notches 23 are milled in this bar.

After the rollers are inserted between the cross members 18, the edges of the members 18 between the notches 23 are swaged or bent over toward the adjacent rollers to restrain the rollers against removal from the retainer. I have, therefore, provided a retainer which prevents removal of the rollers through either side of the bearing, and also provides for the retaining of lubricating material between the cross members of the retainer and the sides of the rollers.

Each spacing bar is provided with a plurality of projecting pads 24 normally contacting with the periphery of the roller whereby all the rollers are aligned in parallel relationship with respect to their longitudinal axis. In addition to providing this means for properly aligning the rollers with respect to the race members, the projecting pads form a minimum of contact space with the rollers to thereby greatly reduce friction in the bearing and to permit of easy rotation of the rollers relative to the race members. The ring portions 16 and 17 are also provided with projecting pads 25 normally contacting with the end faces of the rollers to thereby prevent misaligning of the rollers in a longitudinal direction, as will be clearly apparent from the drawing.

From this description it will be seen that I have provided a roller bearing in which the rollers are permanently retained in a suitable retaining member and that the rollers are maintained in true parallel relationship relative to each other, there being no chance of the rollers getting out of alignment during use.

Referring to Figures 5 to 7 inclusive, I have shown a second form of retainer which comprises a ring member 28 having spaced projecting bars 29 cast integrally therewith. The spacing bars and the ring 28 are provided with projecting pads 30 and 31 respectively to function in the manner and for the same purpose as the pads 24 and 25 heretofore described. The rollers are inserted in the pockets formed between the spacing bars 29 after which the ring member 32 is placed against the end of the spacing bars 29 and held in position thereon by the rivets 33. The retaining ring 32 also may be provided with a projecting pad 34 engaging with the ends of the rollers 14 as illustrated in Figure 5 to thereby prevent longitudinal movement of the rollers in their retainers.

While I have shown two embodiments of my invention, it is understood that formal changes and changes relating to details of construction and manufacture may be resorted to without departing from the spirit and substance of my invention, the scope of which is commensurate with the appended claims.

What I claim is:

1. A roller bearing comprising, spaced inner and outer race members, a plurality of rollers positioned therebetween, and a retainer for said rollers comprising side ring portions and spacing bars therebetween, said spacing bars having a curved portion formed with a radius shorter than the radius of said rollers and having projecting pads adjacent to said curved portion adapted to contact with said rollers to align them in parallel relationship.

2. A roller bearing comprising, spaced inner and outer race members, a plurality of rollers positioned therebetween, and a retainer for said rollers comprising side rings and spacing bars therebetween, said spacing bars each having a curved portion formed with a radius shorter than the radius of said rollers to retain oil soaked waste in contact with said rollers and having integral roller aligning pads thereon adjacent to said curved portion to align said rollers in parallel relationship.

KARL L. HERRMANN.